Patented Dec. 15, 1925.

1,565,375

UNITED STATES PATENT OFFICE.

THILO KROEBER, OF WESTEND-BERLIN, GERMANY, ASSIGNOR TO NAAMLOOZE VENNOOTSCHAP NOURY & VANDER LANDIS HANDELMAATSCHAPPIJ, OF DEVENTER, NETHERLANDS.

PROCESS FOR TREATING FLOUR, MEAL, OR MILLING PRODUCTS AND THE PRODUCTS THEREOF.

No Drawing.     Application filed April 29, 1925.    Serial No. 26,787.

*To all whom it may concern:*

Be it known that I, THILO KROEBER, citizen of Germany, residing at Westend-Berlin, Germany, have invented certain new and useful Improvements in Processes for Treating Flour, Meal, or Milling Products and the Products Thereof, for the broad invention disclosed applications have been filed as follows: Germany, March 19, 1923; Holland March 12, 1924; Great Britain March 19, 1924, France March 19, 1924, and Italy March 18, 1924, and of which the following is a specification.

In Letters Patent No. 1,380,334, a process is described for treating flour or meal or other milling products with peroxides and such like percompounds. In applying this process it has appeared in practice that parts of the peroxides always remain unreacted, and hence not utilized, for a considerable time. The non-reaction, or incomplete reaction may be ascribed to the forming of a thin protective layer or perhaps surface tension, around the small peroxide grains which by the contact with the flour have partly reacted. Apparently this protective layer is formed on every peroxide particle or grain soon after the same has started to react with the flour. While the protective layer does not wholly prevent reaction between the remaining peroxide and the flour, it greatly retards such action and seems to prevent full utilization of the whole of the peroxide added, I have solved the problem by adding peroxide or ozonide, peraldehyde, also denominated oxozonide, perozonide, ozonide-peroxide and their polymers, which are hereinafter generically referred to as a substance of the herein described peroxide-aldehyde-ozonide class, in such a finely divided form that the formation of the objectionable protective layer practically is prevented.

The surprising feature of my process is that not only a better distribution and a quicker action is obtained, but the amount of the substance of the peroxide-aldehyde-ozonide class, to be used in proportion to the amount of the product to be treated is considerably smaller than would be expected when the substance is used in this finely divided condition in the milling products to be treated.

The finely divided condition of the herein described peroxide aldehyde or ozonide class of substances may be conveniently obtained, by comminution in a ball mill in the presence of a liquid that will not decompose the substance of the herein described peroxide aldehyde ozonide class of substances. For instance, water with benzoyl peroxide may be used. The comminution should be continued until the bulk of the particles of the substance have been reduced to about 15 $\mu$ (microns) or less, in diameter. This process of comminuting is claimed in my copending application Serial No. 648,575, filed June 29, 1923. The finely divided solid substance may be used in its moist condition for the bleaching of the flour, meal or other milling products or the liquid may be separated from the substance of the herein described peroxide aldehyde ozonide class, by removing in any well known manner, for instance, by means of sucking away the moisture through a filter or by bringing the moist solid particles in contact with a highly absorbent solid material, such as unburned porous clay, or by leading gases over the same at moderate temperatures, and the substance of the described peroxide aldehyde ozonide class wholly or partly freed from the liquid may then be mixed with the milling product. The addition of the substance may be carried out before, during, or after the milling process.

As an illustration of the proportions of material used, I take about 0.05 gram of the benzoyl peroxide, after being comminuted as above described, and add one kg. of flour, meal or milling products, the amount depending upon the color of the milling product. After a short stirring or mixing of the mass it is left to itself for a short period of time.

The degree of comminution above referred to is somewhat finer than ordinary wheat flour. With peroxide material of this degree of fineness, the protective layer above described does not form, to any appreciable extent.

While heretofore about .02 to .025% of benzoyl peroxide (or ordinary degree of coarseness, as purchased in the market) has been recommended in the treatment of flour, I find that when using the peroxide of my process as described, as small amounts as about .005 per cent is sufficient.

This application is a continuation in part of my application 701865 filed March 25, 1924.

What I claim is:

1. A process which comprises treating an edible milling product with a substance of the herein described peroxide-aldehyde-ozonide class, the major part of the particles of which are not over 15 $\mu$ in diameter.

2. A process which comprises treating an edible milling product with a comminuted substance of the herein described peroxide-aldehyde-ozonide class, the average size of the particles of said substance being smaller than the average size of the particles of ordinary flour.

3. A process for treating flour, meal, or other milling products which comprises treating the said products with a substance of the herein described peroxide-aldehyde-ozonide class, in such a finely divided solid state that no protective layer will be formed around the particles of the added substance.

4. A process as claimed in claim 1 in which the added substance is in the form of a dried solid powder.

5. As a novel product, a mixture comprising an edible milling product and a substance of the herein described peroxide-aldehyde-ozonide class, the average size of the particles of the latter being not larger than the average size of the particles of ordinary flour.

In testimony whereof I affix my signature.

THILO KROEBER.

flour. With peroxide material of this degree of fineness, the protective layer above described does not form, to any appreciable extent.

While heretofore about .02 to .025% of benzoyl peroxide (or ordinary degree of coarseness, as purchased in the market) has been recommended in the treatment of flour, I find that when using the peroxide of my process as described, as small amounts as about .005 per cent is sufficient.

This application is a continuation in part of my application 701865 filed March 25, 1924.

What I claim is:

1. A process which comprises treating an edible milling product with a substance of the herein described peroxide-aldehyde-ozonide class, the major part of the particles of which are not over 15 μ in diameter.

2. A process which comprises treating an edible milling product with a comminuted substance of the herein described peroxide-aldehyde-ozonide class, the average size of the particles of said substance being smaller than the average size of the particles of ordinary flour.

3. A process for treating flour, meal, or other milling products which comprises treating the said products with a substance of the herein described peroxide-aldehyde-ozonide class, in such a finely divided solid state that no protective layer will be formed around the particles of the added substance.

4. A process as claimed in claim 1 in which the added substance is in the form of a dried solid powder.

5. As a novel product, a mixture comprising an edible milling product and a substance of the herein described peroxide-aldehyde-ozonide class, the average size of the particles of the latter being not larger than the average size of the particles of ordinary flour.

In testimony whereof I affix my signature.

THILO KROEBER.

Certificate of Correction.

It is hereby certified that the name of the assignee in Letters Patent No. 1,565,375, granted December 15, 1925, upon the application of Thilo Kroeber, of Westend-Berlin, Germany, for an improvement in " Processes for Treating Flour, Meal, or Milling Products and the Products Thereof," was erroneously written and printed as " Naamlooze Vennootschap Noury Vander Landis Handelmaatschappij, of Deventer, Netherlands," whereas said name should have been written and printed as *Naamlooze Vennootschap Noury & Vander Landes Handelmaatschappij, of Deventer, Netherlands*, as shown by the record of assignments in this office; and that the said Letters Patent should be read with this correction therein that the same may conform to the record of the case in the Patent Office.

Signed and sealed this 23d day of February, A. D. 1926.

[SEAL.]

WM. A. KINNAN,
*Acting Commissioner of Patents.*

Certificate of Correction.

It is hereby certified that the name of the assignee in Letters Patent No. 1,565,375, granted December 15, 1925, upon the application of Thilo Kroeber, of Westend-Berlin, Germany, for an improvement in "Processes for Treating Flour, Meal, or Milling Products and the Products Thereof," was erroneously written and printed as "Naamlooze Vennootschap Noury Vander Landis Handelmaatschappij, of Deventer, Netherlands," whereas said name should have been written and printed as *Naamlooze Vennootschap Noury & Vander Landes Handelmaatschappij, of Deventer, Netherlands*, as shown by the record of assignments in this office; and that the said Letters Patent should be read with this correction therein that the same may conform to the record of the case in the Patent Office.

Signed and sealed this 23d day of February, A. D. 1926.

[SEAL.]

WM. A. KINNAN,
*Acting Commissioner of Patents.*